H. HUNT.
CLOTHES LINE PROP.
APPLICATION FILED APR. 15, 1913.
1,100,375.
Patented June 16, 1914.
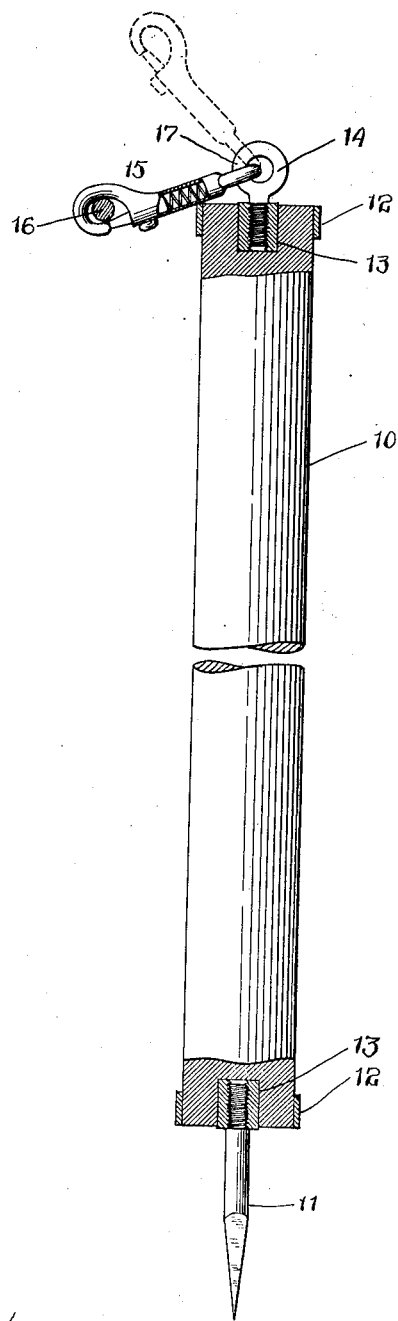
WITNESSES:
H.W. Meade
S.W. Atherton
INVENTOR
Henry Hunt
BY
A.M. Wooster
ATTORNEY

UNITED STATES PATENT OFFICE.

HENRY HUNT, OF NEWTOWN, CONNECTICUT.

CLOTHES-LINE PROP.

1,100,375.  Specification of Letters Patent.  Patented June 16, 1914.

Application filed April 15, 1913. Serial No. 761,224.

*To all whom it may concern:*

Be it known that I, HENRY HUNT, a citizen of the United States, residing at Newtown, county of Fairfield, State of Connecticut, have invented an Improvement in Clothes-Line Props, of which the following is a specification.

This invention has for its object to provide a durable and inexpensive clothes-line prop or clothes pole, so called, which will engage the ground at any place and shall be provided with convenient means for holding a clothes-line securely, said holding means, however, being free to swing relatively to the pole to prevent the pole from being lifted from the ground by sudden gusts of wind and for general convenience and safety in use.

With these and other objects in view, I have devised the novel clothes-line prop which I will now describe, referring to the accompanying drawing forming a part of this specification and using reference characters to indicate the several parts.

The view is an elevation partly in section illustrating the construction and mode of operation of my novel invention.

10 denotes the pole which is provided at its lower end with a spike 11 to engage the ground and retain the pole against displacement. The pole is made of wood and of suitable length to meet any special requirements of use. The spike may be secured to the pole in any ordinary or preferred manner. In high grade poles, in order to insure the greatest possible durability, I preferably place a ferrule 12 at each end of the pole and force into the pole, centrally at each end, an internally threaded sleeve 13. The spike is threaded to engage the sleeve at the lower end and the shank of an eye 14 engages the sleeve at the upper end. The special means of securing either the spike or the eye is not of the essence of the invention, however, and may be varied to suit the requirements of use or the taste or skill of the manufacturer.

15 denotes a line holder comprising a snap hook of the type having a hook to partly inclose the article to be held and a spring-controlled plunger engaging the end of the hook to retain the article, as a clothes-line, indicated by 16, in place. The shank of the snap hook is provided with an eye 17 which is interlocked with eye 14 on the pole, thus permanently securing the snap hook to the pole, but leaving it free to swing either in the horizontal, vertical or any intermediate plane. This construction prevents the pole from being violently displaced by sudden gusts of wind, the effect of which is simply to cause the line to swing the snap hook over from side to side and to swing to a limited extent in the horizontal plane, the idea being to prevent positive action of the line on the pole when the direction of the wind changes, and, by permitting the line to swing the snap hook about freely, to prevent the pole from being lifted from the ground.

Having thus described my invention I claim:

In a clothes-line prop the combination of a pole and line holder pivoted to the extreme upper end of the pole to swing from one side thereof to the other, whereby the clothes-line may swing freely over the top of the pole and prevent the pole from being lifted from the ground by a gust of wind.

In testimony whereof I affix my signature in presence of two witnesses.

HENRY HUNT.

Witnesses:
 EDWARD S. PITZSCHLER,
 OSCAR PITZSCHLER.

Copies of this patent may be obtained for five cents each, by addressing the "Commissioner of Patents, Washington, D. C."